(12) United States Patent
Nakajima

(10) Patent No.: US 8,469,809 B2
(45) Date of Patent: Jun. 25, 2013

(54) GAME APPARATUS, STORAGE MEDIUM STORING GAME PROGRAM AND GAME CONTROLLING METHOD

(75) Inventor: Souichi Nakajima, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1615 days.

(21) Appl. No.: 11/196,237

(22) Filed: Aug. 4, 2005

(65) Prior Publication Data

US 2006/0046843 A1 Mar. 2, 2006

(30) Foreign Application Priority Data

Sep. 1, 2004 (JP) ................................. 2004-254243

(51) Int. Cl.
*A63F 13/06* (2006.01)

(52) U.S. Cl.
USPC .............................................. 463/37; 463/30

(58) Field of Classification Search
USPC ................................................. 463/30, 1, 37
See application file for complete search history.

(56) References Cited

U.S. PATENT DOCUMENTS

| | | | | |
|---|---|---|---|---|
| 5,662,523 | A * | 9/1997 | Yasumaru et al. | 463/30 |
| 5,669,818 | A * | 9/1997 | Thorner et al. | 463/30 |
| 5,734,373 | A * | 3/1998 | Rosenberg et al. | 345/161 |
| 6,296,570 | B1 * | 10/2001 | Miyamoto et al. | 463/30 |
| 6,375,572 | B1 * | 4/2002 | Masuyama et al. | 463/43 |
| 6,461,238 | B1 * | 10/2002 | Rehkemper et al. | 463/6 |
| 6,645,076 | B1 * | 11/2003 | Sugai | 463/30 |
| 2001/0003708 | A1 * | 6/2001 | Aizu et al. | 463/7 |
| 2002/0032053 | A1 * | 3/2002 | Shoji et al. | 463/30 |
| 2002/0082079 | A1 * | 6/2002 | Mantyjarvi et al. | 463/30 |

FOREIGN PATENT DOCUMENTS

| | | |
|---|---|---|
| JP | 11-33229 A | 2/1999 |
| JP | 11-085400 | 3/1999 |
| JP | 11-126014 A | 5/1999 |
| JP | 2002-35421 A | 2/2002 |
| JP | 2003-248540 A | 9/2003 |

OTHER PUBLICATIONS

JP Pub. # 11-085400 English Translation.*
Sakazaki Naoyuki, Oct. 22, 1997, Japanese Application 11-126014 Translation.*
FLS, Inc., English Translation of Japanese Pub. # 11-126014.*

* cited by examiner

*Primary Examiner* — Damon Pierce
(74) *Attorney, Agent, or Firm* — Nixon & Vanderhye P.C.

(57) ABSTRACT

A game apparatus includes an LCD, and a touch panel is placed on a top surface of the LCD. A player instructs an enemy character displayed on the LCD by use of a stick to attack the enemy character. For example, in a case that the enemy character exists at a depth of a game screen, little damage is applied to the enemy character, and a weak vibration is applied to the game apparatus. Conversely, in a case that the enemy character exists at a front of the game screen, much damage is applied to the character, and a strong vibration is applied to the game apparatus. In either case, the vibrations are transmitted to the fingers or hands of the payer via the stick.

13 Claims, 11 Drawing Sheets

(A) VIBRATION OF GAME APPARATUS: SMALL (B) VIBRATION OF GAME APPARATUS: MIDDLE (C) VIBRATION OF GAME APPARATUS: LARGE

| Z COORDINATES VALUE | DAMAGE (HP) | STRENGTH OF VIBRATION (FREQUENCY) |
|---|---|---|
| Z0-Z1 | MUCH (300P) | LARGE (f3) |
| Z1-Z2 | MIDDLE (200P) | MEDIUM (f2) |
| Z2-Z3 | LITTLE (100P) | SMALL (f1) |

(B)

| ACTION | DAMAGE (HP) | STRENGTH OF VIBRATION (FREQUENCY) |
|---|---|---|
| C-th FRAME- D-th FRAME (AFTER-ATTACK) | MUCH (300P) | LARGE (f3) |
| B-th FRAME- C-th FRAME (MID-ATTACK) | MEDIUM (200P) | MIDDLE (f2) |
| A-th FRAME- B-th FRAME (BEFORE-ATTACK) | LITTLE (100P) | SMALL (f1) |

| HP<br>(ENEMY CHARACTER) | DAMAGE (HP) | STRENGTH OF VIBRATION (FREQUENCY) |
|---|---|---|
| 1000-1500 | MUCH (300P) | LARGE (f3) |
| 500-1000 | MEDIUM (200P) | MIDDLE (f2) |
| 0-500 | LITTLE (100P) | SMALL (f1) |

(B)

| STATE<br>(ENEMY CHARACTER) | DAMAGE (HP) | STRENGTH OF VIBRATION (FREQUENCY) |
|---|---|---|
| ATTACK | MUCH (300P) | LARGE (f3) |
| NORMAL | MEDIUM (200P) | MIDDLE (f2) |
| DEFENCE | LITTLE (100P) | SMALL (f1) |

GAME APPARATUS, STORAGE MEDIUM STORING GAME PROGRAM AND GAME CONTROLLING METHOD

BACKGROUND

1. Field of the Technology

The present technology relates to a game apparatus, a storage medium storing a game program, and a game controlling method. More specifically, the present technology relates to a game apparatus, a storage medium storing a game program, and a game controlling method that perform a predetermined process by operating a touch panel.

2. Description of the Prior Art

One example of this kind of a conventional game apparatus is disclosed in a Japanese Patent Laying-open No. 11-85400 [G06F 3/033, G09G 5/00] laid-open on Mar. 30, 1999. According to this prior art, a display panel is supported so as to be vibrated by a vibrating element. On the display panel, an image representing an option to be selected with a pen by an operator as a window, an icon, etc. is displayed. When the operator applies a selecting instruction with the pen, the kind of the vibration depending on the kind of the selected image is determined. Then, the vibrating element is operated at the determined vibration to vibrate the display panel. Thus, the vibration corresponding to the image can be transmitted to the operator via the pen, providing an interface function with reality.

However, in the prior art, the kind of the vibration is uniquely set for each image. For example, the kind of the vibration is never changed even irrespective of changes of a display manner of the image or a state of the image. That is, the same vibration is applied when the image is instructed at any timing, and therefore, it is impossible to recognize with the vibration the relationship between the instructed timing and the display state of the image and the situation of the image. It could not be said that the operator obtained enough sense of reality. Furthermore, in a case of directly applying such the prior art to the game apparatus, (change) difference of the display manner or the state (circumstance) of the enemy character in the game such as a movement of the enemy character, the attack of the enemy character on a player character, changes of a life, an offensive power, or mentality of the enemy character, etc. was not able to sensuously be informed.

SUMMARY

Therefore, it is a primary feature of the exemplary embodiment presented herein to provide a novel game apparatus, storage medium storing a game program, and game controlling method.

Another feature of the exemplary embodiment is to provide a game apparatus, a storage medium storing a game program, and a game controlling method that are able to provide a new sense of operation with reality.

A game apparatus according to the an exemplary embodiment is provided with a display for displaying a game screen, a touch panel provided in association with the display, and a vibrator for vibrating at least a screen of the display. The game apparatus comprises a game screen displaying means, an updating means, a detecting means, an obtaining means, and a vibration controlling means. The game screen displaying means displays the game screen including an image of a character appearing in a game on the screen of the display. The updating means updates a parameter for changing a display manner of the character or a state of the character in the game in correspondence to the proceeding of the game. The detecting means detects position coordinates in response to an operation input to the touch panel. The obtaining means obtains the parameter of the character at a time of the operation input to the touch panel when the position coordinates detected by the detecting means is included in the display area of the character. And, the vibration controlling means vibrates the vibrator in a vibration pattern according to the parameter obtained by the obtaining means.

More specifically, the game apparatus (10: a reference numeral corresponding in the "detailed description of the preferred embodiment" described later and so forth) is provided with the display (14) for displaying the game screen, the touch panel (22) provided in association with the display (14), and the vibrator (28*c*) for vibrating at least the display (14). The game screen displaying means (42, 52, 58, 60) displays the game screen (70) including the image of the character (72) appearing in the game on the screen of the display (14). The updating means (42) updates the parameter for changing the display manner of the character (72) or the state of the character in the game such as the life, the offensive power, the level, the position in the game space, the animation reproduction elapsed time of the character (72) in correspondence to the proceeding of the game. Here, the level means total strength of the character (72) such as the life, the offensive power, etc. The detecting means (42, 54, S7) detects the position coordinates in response to the operation input to the touch panel (22). The obtaining means (42, S21, S51) obtains the parameter of the character (72) at a time of the operation input to the touch panel by determining that the operation position of the touch panel 22 touches the character 72 ("YES" in the step S13) when the position coordinates detected by the detecting means (42, 54, S7) is included in the display area of the character (72). The vibration controlling means (42, S29, S37, S45, S59, S67, 75) vibrates the vibrator (28*c*) in the vibration pattern according to the parameter obtained by the obtaining means (42, S21, S51). Thus, at least the display (14) is vibrated to transmit its vibration to the player who operates the touch panel (22).

According to the exemplary embodiment, the vibrator is vibrated in the vibration pattern according to the parameter of the character to transmit its vibration to the player, allowing the player to know the display manner of the game character or the state of the game character in the game that are changed in correspondence to the proceeding of the game. That is, the player can obtain a new sense of operation.

In one embodiment, the updating means updates arrangement coordinates of the character in a game space as the parameter, and the vibration controlling means vibrates the vibrator in a vibration pattern according to the arrangement coordinates. More specifically, the updating means (42) updates the arrangement coordinates of the character (72) in the game space as the parameter. Accordingly, the vibration controlling means (42, S29, S37, S45) vibrates the vibrator (28*c*) in the vibration pattern in correspondence to the arrangement coordinates obtained when the player operates the touch panel (22). That is, the vibrator is vibrated in the vibration pattern in correspondence with the arrangement position of the character, and this allows the player to know the arrangement position of the character by the vibration.

In another embodiment, the updating means updates an animation reproduction elapsed time of the character as the parameter, and the vibration controlling means vibrates the vibrator in a vibration pattern according to the animation reproduction elapsed time. More specifically, the updating means (42) updates the animation reproduction elapsed time of the character (72) as the parameter. For example, the animation of the character (72) existing in the game space is changed between the attack state, the normal state, and the defensive state according to a lapse of time (frame: screen updating time). In addition, in the attack state, the animation is changed between a before-attack state, a mid-attack state, and an after-attack state. The vibration controlling means (42, S59, S67, S75) vibrates the vibrator (28c) in the vibration pattern according to the animation reproduction elapsed time. The vibration is transmitted to the player via the display (14) and the touch panel (22). Accordingly, it is possible to provide the vibration according to the animation reproduction elapsed time. That is, the vibration according to the action of the character, and therefore, the player can know the action state of the animation by the vibration.

In another embodiment, the updating means updates a flag for determining whether at least the character is an attack state or a non-attack state as the parameter, and the vibration controlling means vibrates the vibrator in a vibration pattern according to turn-on/off of the flag. More specifically, the updating means (42) updates the flag for determining whether at least the character is the attack state or the non-attack state as the parameter. For example, flags each indicating the attack-state and the non-attack state is stored, and if it is the attack state, the attack-state flag is turned on, and the non-attack state flag is turned off. On the contrary thereto, if it is the non-attack state, the attack-state flag is turned off, and the non-attack state flag is turned on. The vibration controlling means (42, S59, S67, S75) vibrates the vibrator (28c) in the vibration pattern according to turn-on/off of the flag. That is, difference between the attack state and the non-attack is provided to the player by the vibration. Thus, the vibrator is vibrated in the vibration pattern depending on the attack state and the non-attack state, and therefore, it is possible to know the attack state and the non-attack state by the vibration, and confirm the damage by the attack of the player.

In another embodiment, the updating means updates life, offensive power and mentality of the character as the parameter, and the vibration controlling means vibrates the vibrator in a vibration pattern according to at least one of the life, offensive power and mentality of the character. More specifically, the updating means (42) updates the attribute of the character such as the life (HP), the offensive power (MP) and the mentality (normal state, excited state) as the parameter. It is noted that the level can also be updated. The vibration controlling means (42) vibrates the vibrator (28c) in the vibration pattern according to the current attribute of the character, that is, at least one of the HP, MP and mentality. For example, according to the numerical value of the current HP of the character, the strength of the vibration is changed. That is, the vibration depending on the current attribute of the character is provided to the player, and therefore, the player can know the current attribute of the character by the vibration.

In one aspect of the exemplary embodiment presented herein, the vibration controlling means includes a selecting means for selecting one vibration pattern corresponding to the parameter out of the plurality of vibration patterns. More specifically, the selecting means (42, S23, S31, S39, S53, S61, S69) selects one vibration pattern corresponding to the parameter out of the plurality of vibration patterns. For example, in a case that the vibrator (28c) is utilized as a eccentric motor, the strength of the vibration of the vibrator (28c) can be changed by changing at least one of a frequency and a pulse width (duty ratio) of a driving signal (PWM signal), capable of realizing the vibration in the plurality of vibration patterns. Thus, by changing the strength of the vibration, it becomes possible to make the vibration in the plurality of vibration patterns, and by the vibration, it is possible to transmit to the player the display manner of the character or the state of the character in the game.

A storage medium storing a game program according to an exemplary embodiment, the game program is executed by a game apparatus provided with a display for displaying a game screen, a touch panel provided in association with the display, and a vibrator for vibrating at least a screen of the display. The game program causes a processor of the game apparatus to execute a game screen displaying step, an updating step, a detecting step, an obtaining step, and a vibration controlling step. The game screen displaying step displays the game screen including an image of a character appearing in a game on the screen of the display. The updating step updates a parameter for changing a display manner of the character or a state of the character in the game in correspondence to the proceeding of the game. The detecting step detects position coordinates in response to an operation input to the touch panel. The obtaining step obtains the parameter of the character at a time of the operation input to the touch panel when the position coordinates detected by the detecting step is included in the display area of the character. And, the vibration controlling step executes the vibration controlling step for vibrating the vibrator in the vibration pattern according to the parameter obtained by the obtaining step.

A game controlling method according to an exemplary embodiment is a game controlling method of a game apparatus provided with a display for displaying a game screen, a touch panel provided in association with the display, and a vibrator for vibrating at least a screen of the display. The game controlling method includes following steps of :(a) displaying the game screen including an image of a character appearing in a game on the screen of the display; (b) updating a parameter for changing a display manner of the character or a state of the character in the game in correspondence to the proceeding of the game; (c) detecting position coordinates in response to an operation input to the touch panel; (d) obtaining the parameter of the character at a time of the operation input to the touch panel when the position coordinates detected by the step (c) is included in the display area of the character; and, and (e) vibrating the vibrator in a vibration pattern according to the parameter obtained by the step (d).

The above described features, aspects and advantages of the exemplary embodiment presented herein will become more apparent from the following detailed description when taken in conjunction with the accompanying drawings.

BRIEF DESCRIPTION OF THE DRAWINGS

FIG. 5 is an illustrative view showing an example of a table in which an intensity of damage or strength of a vibration according to a display manner of the enemy character and a parameter of the enemy character are shown, and;

FIG. 11 is an example of a table for changing the intensity of the damage and the strength of the vibration depending on an HP of a player or a player character, or whether or not the enemy character is in an attacking state.

DETAILED DESCRIPTION OF THE PREFERRED EMBODIMENTS

Figure 1:
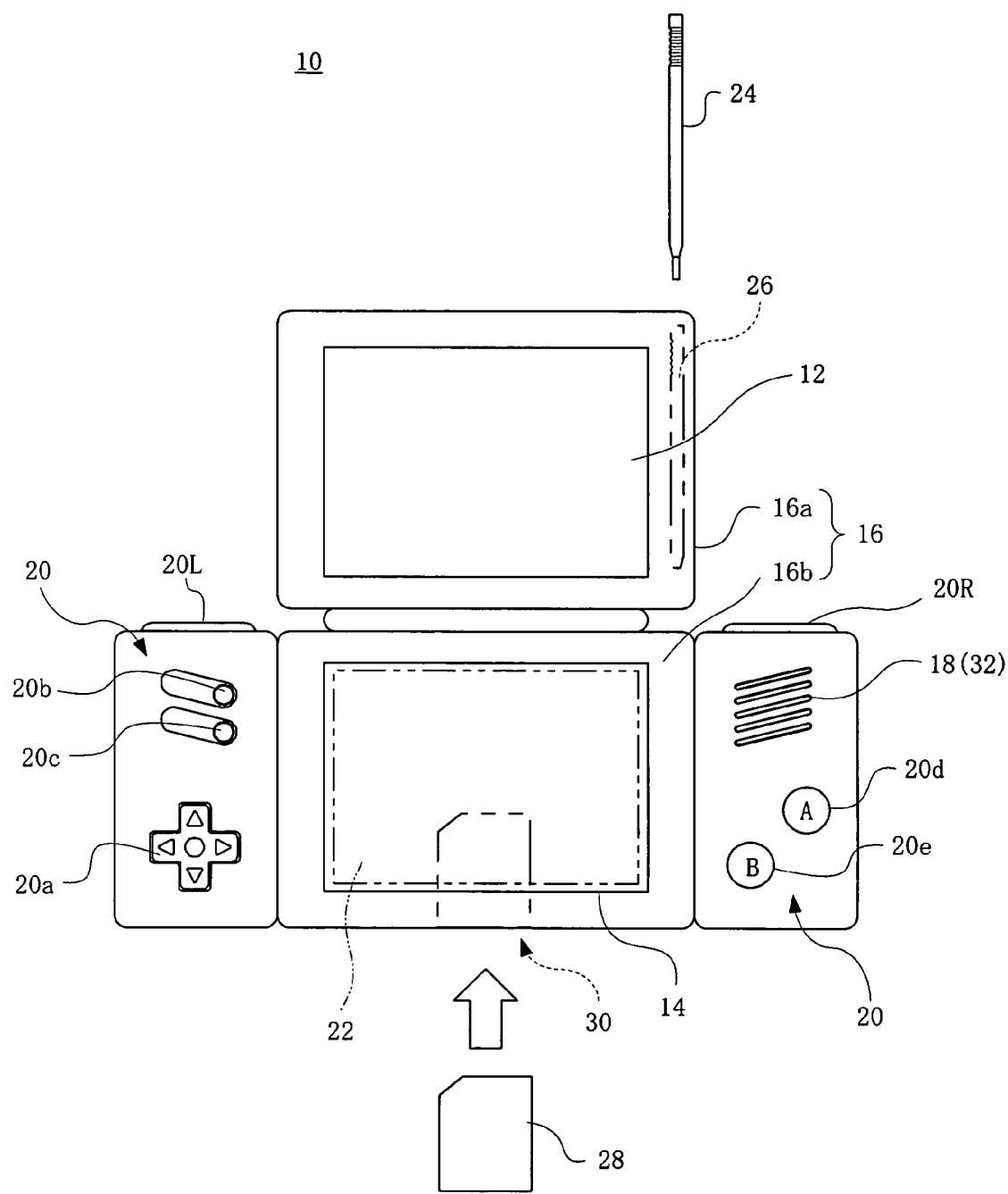
FIG. 1 is an illustrative view showing one example of a game apparatus of an exemplary embodiment.

Referring to FIG. 1, a game apparatus 10 of one embodiment includes a first liquid crystal display (LCD) 12 and a second LCD 14. The LCD 12 and the LCD 14 are provided on a housing 16 so as to be arranged in a predetermined arrangement position. In this embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating any one of four depression portions. The start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch 20L (L button) and the action switch 20R (R button) are formed by the push button, and the L button 20L and the R button 20R can perform the same operation as the A button 20d and the B button 20e, and also function as a subsidiary of the A button 20d and the B button 20e.

Also, on a top surface of the LCD 14, a touch panel 22 is provided. As the touch panel 22, any kinds of a resistance film system, an optical system (infrared rays system) and an electrostatic capacitive coupling system, for example, can be utilized. In response to an operation by depressing, stroking (touching), and so forth with a stick 24, a pen (stylus pen), or a finger (hereinafter, referred to as "stick 24", etc.) on a top surface of the touch panel 22, the touch panel 22 detects a coordinates of the operation position of the stick 24, etc. to output coordinates data corresponding to the detected coordinates.

It is noted that in this embodiment, a resolution of the display surface of the LCD 14 is 256 dots×192 dots, and a detection accuracy of a detection surface (operation surface) of the touch panel 22 is also rendered 256 dots×192 dots in correspondence to the resolution of the display surface (this is true for the LCD 12). It is noted that although the touch panel 22 is shown so as to be different from the LCD 14 in size for simplicity in FIG. 1, the display screen of the LCD 14 is the same as the operation surface of the touch panel 22 in size. However, detection accuracy of the detection surface of the touch panel 22 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including an image such as textual information, an icon, etc. for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, textual information, an icon, etc. to be displayed on the LCD 14 and select commands by operating the touch panel 22 with the use of the stick 24, etc.

It is noted that depending on the kind of the game, the player is able to use the LCD 14 for another various input instructions, such as selecting or operating the icon displayed on the LCD 14, instructing a coordinates input, and so forth.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22).

Furthermore, in this embodiment, the stick 24 can be inserted into a housing portion (slot or concave) 26 provided in proximity to a side surface (right side surface) of the upper housing 16*a*, for example, and taken out therefrom as necessary. It is noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16*b*. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound release hole 18 inside the lower housing 16*b*.

Furthermore although omitted in FIG. 1, for example, a battery accommodating box is provided on a rear surface of the lower housing 16*b*, and a power switch, a volume switch, an external expansion connector, an earphone jack, etc. are provided on a bottom surface of the lower housing 16*b*.

Figure 2:
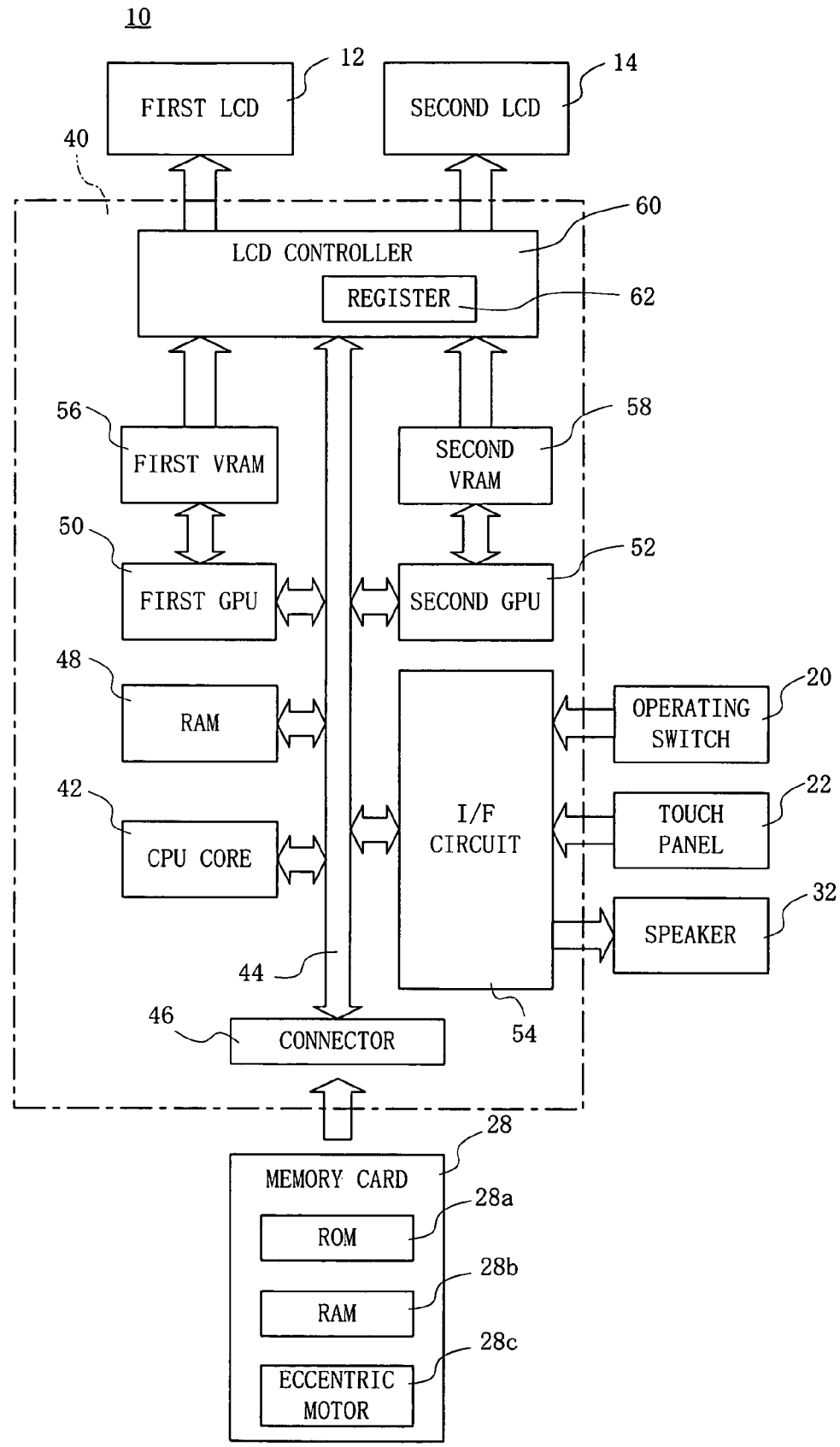
FIG. 2 is a block diagram showing an electrical configuration of the game apparatus shown in FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28*a* and a RAM 28*b*, and although illustration is omitted, the ROM 28*a* and the RAM 28*b* are connected with each other via a bus and also connected with a connector (not shown) to be connected with the connector 46. Accordingly, the CPU core 42 gains access to the ROM 28*a* and the RAM 28*b* as described above. Furthermore, the memory card 28 is provided with an eccentric motor 28*c* as a vibrator. The eccentric motor 28*c* is separate and independent of the ROM 28*a* and the RAM 28*b*, and, although illustration is omitted, is connected to the CPU core 42 via a signal line, the connector 46, etc. It is noted that it is not limited to the eccentric motor 28*c*, and vibrators formed of piezoelectric elements, etc., vibrators formed of a voice coil, etc., can be used.

The ROM 28*a* stores in advance a game program for a game (virtual game) to be executed by the game apparatus 10, image (character image, background image, item image, icon (button) image, message image, etc.) data, data of the sound (music) necessary for the game (sound data), etc. The RAM (backup RAM) 28*b* stores (saves) proceeding data and result data of the game.

The eccentric motor 28*c* is driven (operated) in response to a driving signal (PWM signal) from the CPU core 42. When the eccentric motor 28*c* is operated, a shaft thereof rotates to generate a vibration which is transmitted to the game apparatus 10. For example, strength of the vibration, that is, the kind of the vibration (vibration pattern) can be changed by changing any one of a frequency and a pulse width (duty ratio) of the driving signal.

The RAM 48 is utilized as a buffer memory or a working memory. That is, the CPU core 42 loads the game program, the image data, the sound data, etc. stored in the ROM 28*a* of the memory card 28 into the RAM 48, and executes a process according to the loaded game program. The CPU core 42 executes a game process while storing in the RAM 48 data (game data, flag data, etc.) temporarily generated in correspondence with a proceeding of the game.

It is noted that the program, the image data, the sound data, etc. are loaded from the ROM 28*a* entirely at a time, or partially and sequentially as necessary so as to be stored (loaded) into the RAM 48.

Noted that a program as to another application except for the game and image data necessary for executing the application are stored in the ROM 28*a* of the memory card 28. Furthermore, sound (music) data may be stored as necessary. In such a case, in the game apparatus 10, the application is executed.

Each of the GPU 50 and the GPU 52 forms a part of a rendering means, is constructed by, for example, a single chip ASIC, and receives a graphics command (construction command) from the CPU core 42 to generate game image data according to the graphics command. It is noted that the CPU core 42 applies to each of the GPU 50 and the GPU 52 an image generating program (included in the game program) required to generate the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 gains access to the first VRAM 56 and the second VRAM 58 to obtain data (image data: data such as character data, texture, etc.) required to execute the construction command. It is noted that the CPU core 42 reads the image data necessary for rendering from the RAM 48, and writes it to the first VRAM 56 and the second VRAM 58 through the GPU 50 and the GPU 52. The GPU 50 accesses the VRAM 56 to create the game image data for rendering. The GPU 52 accesses the VRAM 58 to create the game image data for rendering.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

It is noted that the LCD controller 60 can directly read the image data from the VRAM 56 and the VRAM 58, or read the image data from the VRAM 56 and the VRAM 58 via the GPU 50 and the GPU 52.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, coordinates data output from the touch panel 22 is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

In the game apparatus 10 with such a configuration, the player can instruct a player character, an enemy character, an item character, etc. to be displayed on a game screen (screen of the LCD 14) by depressing the touch panel 22 with the stick 24, etc. as described above. Examples are able to move the player character, to attack the enemy character, to obtain the item character, and so forth. Thus, in a case that the player performs a game operation with the stick 24, etc., the eccentric motor 28c is activated to vibrate the game apparatus 10, thus capable of directly or indirectly applying the vibration to player's finger via the stick 24. That is, being provided with the vibration in addition to the game screen, sound (music), the player can obtain a sense of operation with reality.

For example, it is possible to provide different kinds (pattern) of vibrations for each game character such as the player character and the enemy character. This can be realized by changing at least one of the frequency and the pulse width of the driving signal (PWM signal) to be applied to the eccentric motor 28c as described above.

However, if the kind of the vibration is fixed for each game character, it becomes impossible to change a display manner of the game character or a state (circumstance) of the game character in the game. For example, in a case that the enemy character gradually moves from the depth of the screen to the front of the screen to come near to the player character, at a time of attacking the enemy character, the same vibration may be applied irrespective of the position of the enemy character. Furthermore, the same vibration may be applied regardless of whether or the attack is performed when the enemy character is in an attack state or the enemy character is in a no-attack state (defensive state or normal state). In addition, regardless of changes of the life (HP), offensive power (MP), or mentality of the enemy character, the same vibration may be applied.

Thus, when the kind of the vibration (vibration pattern) is uniquely determined for each game character, the display manner of the game character or the state (circumstance) of the game character in the game cannot be informed with vibrations, and therefore, it is difficult to say that a sense of operation with reality can be obtained. In addition, in such a case, if the same game characters appear, the same vibration is applied, and therefore, it may be possible that the game becomes monotonous, and the player reduces an interest in the game.

Here, in this embodiment, the vibration pattern is changed according to the display manner of the game character or the state of the game character in the game, which provides a new sense of operation with reality.

Specifically, the display manner of the game character or the state of the game character in the game are changed by changing (varying) parameters such as the life (HP), offensive power (MP), level (LV), mentality, arrangement position (three-dimensional position), reproduction elapsed time of animation of the game character in correspondence to the proceeding of the game. In this embodiment, in addition to the HP, the MP and the LV, the mentality, the arrangement position or the reproduction elapsed time of the animation (animation reproduction elapsed time) can also be set as the parameter. This is because the mentality, the arrangement position, and the animation reproduction elapsed time are also changed in correspondence to the proceeding of the game.

Figure 3:
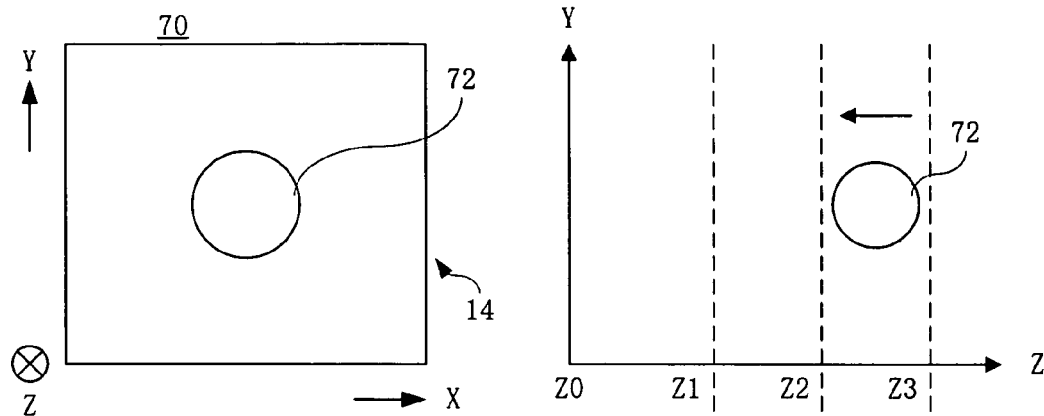
FIG. 3 is an illustrative view showing a display example of the LCD of the game apparatus shown in FIG. 1, an arrangement position of an enemy character, and strength of a vibration in correspondence to the arrangement position.
Figure 3:
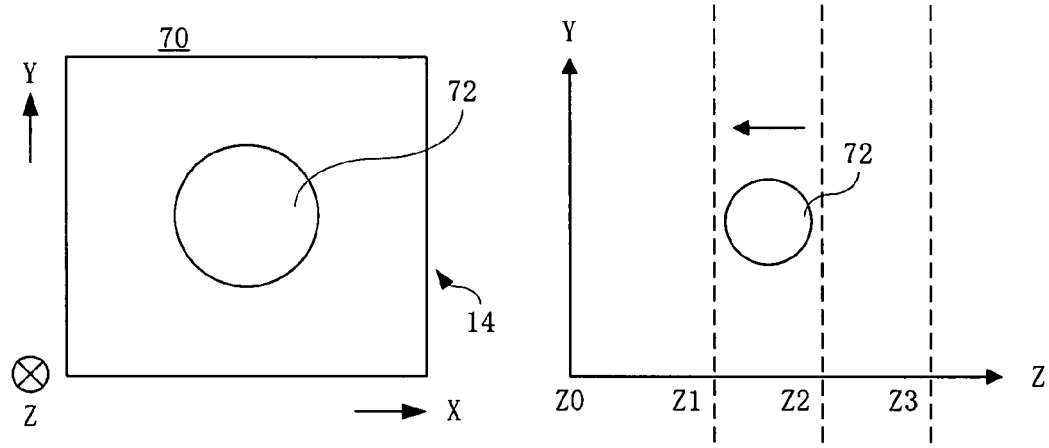
Figure 3:
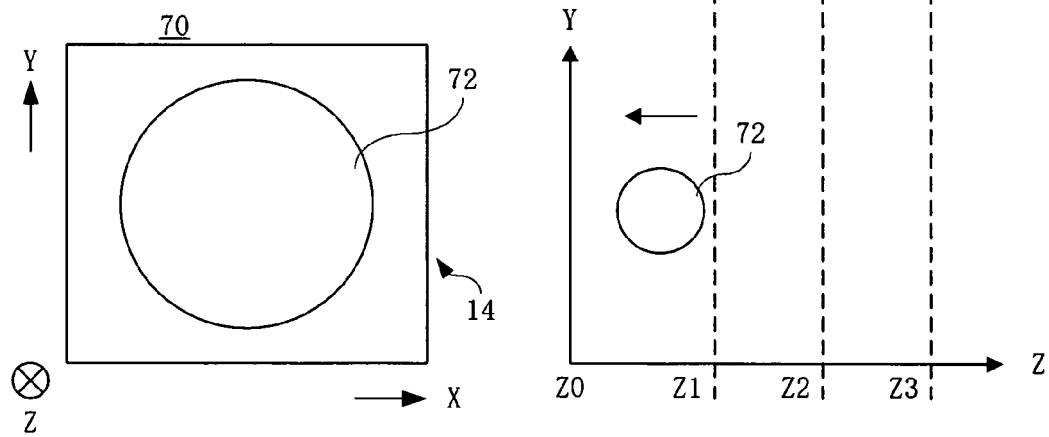

FIG. 3 is an illustrative view showing an example changing the intensity of the damage to be applied to the enemy character and the vibration pattern to be applied to the game apparatus 10 (the strength of the vibration in this embodiment) in correspondence to the display manner of the enemy character, that is, the arrangement position (Z coordinates in this embodiment) of the enemy character existing in the three-dimensional virtual game space in a case that the player or the player character (not illustrated) attacks the enemy character.

It is noted that in FIG. 3, as to the game screen 70 at the left, a horizontal direction of the page is an X-axis direction, a longitudinal direction of the page is a Y-axis direction, and the vertical direction to the page is a Z-axis direction. In addition, as to the three-dimensional coordinates in the right, the horizontal direction of the page is the Z-axis direction, the longitudinal direction of the page is the Y-axis direction, and the vertical direction to the page is the X-axis direction. In addition, the value of the Z coordinates (Z value) approximates to the original point as it is closer to the Z0, and the magnitude of the Z value is Z0<Z1<Z2<Z3.

As to the game screen 70 shown at the left of the FIG. 3 (A), the enemy character 72 is displayed in a relatively small manner. This means that the enemy character 72 exists in the depth of the screen (far). Furthermore, the three-dimensional coordinates at the right of the FIG. 3(A) shows that the value of the Z coordinates (Z value) of the enemy character 72 exists within the Z2-Z3 range (Z2≦Z<Z3). At this time, when the player instructs the enemy character 72 with the stick 24, etc. and attacks the enemy character 72, relatively little damage is applied to the enemy character 72, and a relatively small vibration is applied to the game apparatus 10. That is, the vibration in correspondence with the intensity of the damage is applied to the game apparatus 10. The same is true for the following.

More specifically, the CPU core 42 subtracts a relatively small value (100 points (100 P), for example) from the HP of the enemy character 72, and applies a driving signal of a relatively low frequency f1 (200 Hz, for example) with a constant pulse width W1 to the eccentric motor 28c. It is noted that a voltage value (crest value) of the driving signal is constant (5V, for example). The same is true for the following. Thus, the eccentric motor 28c is activated to apply a small (weak) vibration (small vibration) to the game apparatus 10. Then, the vibration is transmitted to the fingers of the player via the stick 24 indirectly or directly. The same is true for the following.

The game screen 70 shown at the left of FIG. 3(B) explains a case that the enemy character 72 exists nearer to (is closer to) the front of the screen than in a state shown in FIG. 3(A), and the three-dimensional coordinates at the right of FIG. 3(B) shows a case that the Z value of the enemy character 72 is within the Z1-Z2 range (Z1≦Z<Z2). At this time, when the player instructs the enemy character 72 with the stick 24, etc. and attacks the enemy character 72, medium damage is applied to the enemy character 72, and a medium vibration is applied to the game apparatus 10 in response thereto. That is, the CPU core 42 subtracts a medium value (200 P, for example) from the HP of the enemy character 72, and applies a driving signal of a frequency f2 (300 Hz, for example) with a constant pulse width W1 to the eccentric motor 28c. Thus, the medium vibration (middle vibration) is applied to the game apparatus 10.

The game screen 70 shown at the left of FIG. 3(C) explains a case that the enemy character 72 exists nearer to (is closer to) the front of the screen than in the state in FIG. 3(B), and the three-dimensional coordinates shown at the right of FIG. 3(C) shows that the Z value of the enemy character 72 is within the Z0-Z1 range (Z0≦Z<Z1). At this time, when the player instructs the enemy character 72 with the stick 24, etc. and attacks the enemy character 72, relatively much damage is applied to the enemy character 72, and a relatively large vibration is applied to the game apparatus 10 in response thereto. That is, the CPU core 42 subtracts a relatively large value (300 P, for example) from the HP of the enemy character 72, and applies a driving signal of a relatively high frequency f3 (400 Hz, for example) with the constant pulse width W1 to the eccentric motor 28c. Thus, a large (strong) vibration (large vibration) is applied to the game apparatus 10.

In this manner, in correspondence with the arrangement position (Z value) of the enemy character 72 at a time that the player or the player character attacks the enemy character 72, the intensity of the damage to be applied to the enemy character 72 is changed, and the intensity of the damage is represented by the strength of the vibration. Thus, it is possible for the player to recognize (perceive) the intensity of the damage.

It is noted that the arrangement position of the enemy character 72 may successively be changed at short intervals. In this case, the player has to make a touch operation in accordance with quick changes of the arrangement position of the enemy character 72, providing an advantage of making the game more interesting.

It is noted that for the sake of explanation, the strength of the vibration is represented in three steps. However, the strength of the vibration may be changed in two steps in accordance with the change of the intensity of the damage, and the strength of the vibration may be changed in equal to or more than four steps. In addition, the strength of the vibration is changed in three steps in this embodiment, and therefore, for the sake of explanation, the strength of the vibration is represented by large, middle, small so as to represent a difference of the relative intensity of the vibration between three steps. This is true for the magnitude of the frequency and the intensity of the damage.

Furthermore, in this embodiment, the frequency of the driving signal is changed to change the strength of the vibration, and whereby, the game apparatus 10 can be vibrated at a different vibration pattern. However, the pulse width W1 of the driving signal may be changed. In such a case, the longer the pulse width W1 is, the stronger the player feels the vibration, and the shorter the pulse width W1 is, the weaker he or she feels the vibration. It is noted that both of the frequency and the pulse width of the driving signal may be changed.

Also, in FIG. 3 example, as the enemy character 72 exists nearer to (is closer to) the front of the screen, the strength of the vibration is made strong (large). However, as the enemy character 72 exists nearer to (is closer to) the front of the screen, the strength of the vibration may be made weak (small).

In addition, in this embodiment, in correspondence with the Z coordinates of the enemy character 72 as the arrangement position, the intensity of the damage to be applied to the enemy character 72 and the strength of the vibration to be applied to the game apparatus 10 are changed. However, these may be changed in correspondence with the X coordinates or the Y coordinates, or these may be changed in correspondence with the combination of any two or more out of the X coordinates, the Y coordinates, and Z coordinates.

Figure 4:
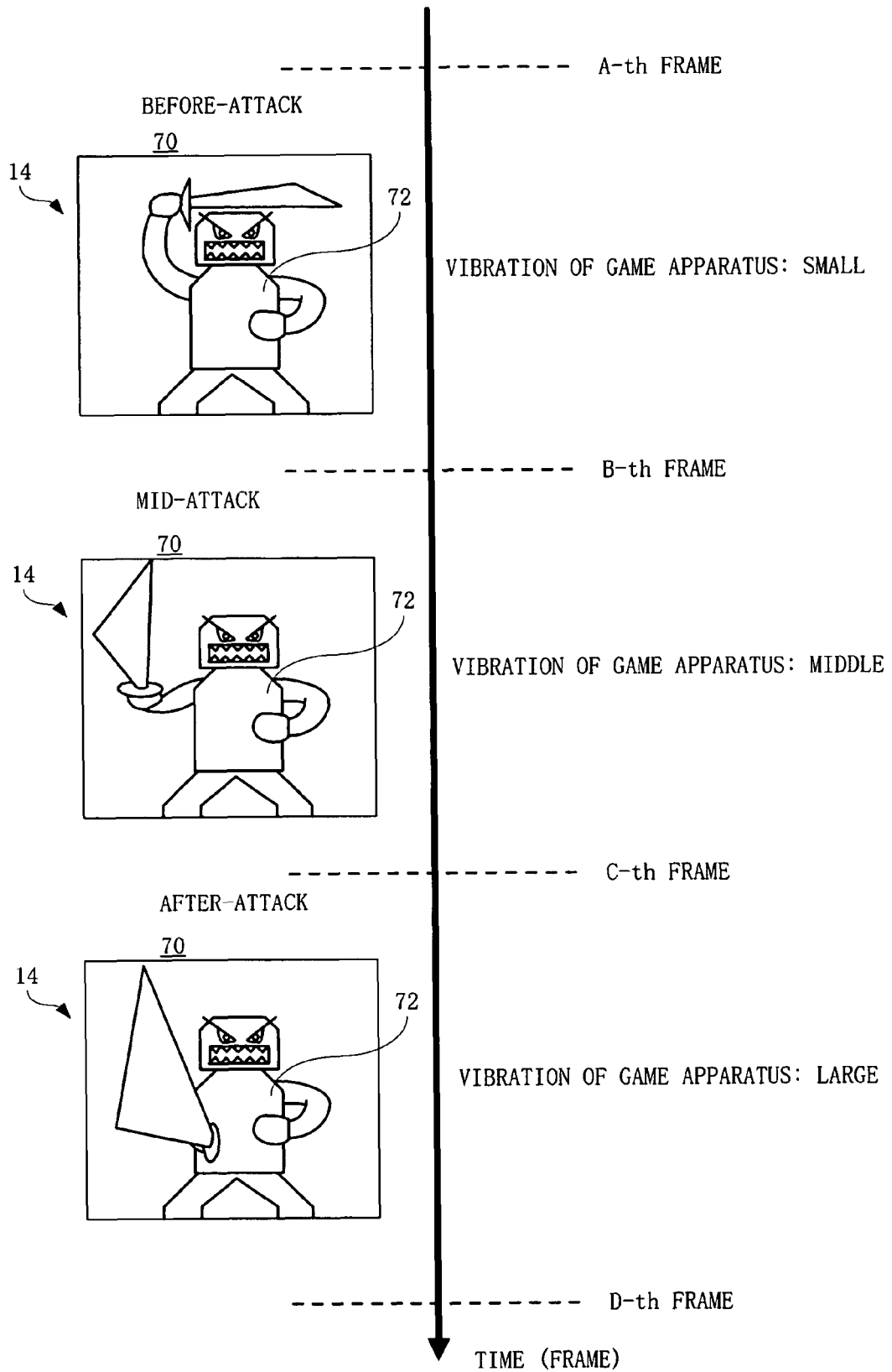
FIG. 4 is an illustrative view showing a display example of the LCD of the game apparatus shown in FIG. 1, a state relating to an attack of the enemy character, and strength of a vibration corresponding to the state.

FIG. 4 is an illustrative view showing an example of changing the damage to be applied to the enemy character and the strength of the vibration to be applied to the game apparatus 10 depending on the state of the enemy character in the game in a case that the player or the player character attacks the enemy character.

As understood from FIG. 4, as the action state of the enemy character 72 changes in the order of a before-attack state, a mid-attack state, and an after-attack state according to the animation reproduction elapsed time (frame: screen updating time period), and the display manner of the enemy character 72 or the state of the enemy character 72 in the game is also changed. In this embodiment, the range (length) of the animation reproduction elapsed time (to be simply referred to as "elapsed time") shown in FIG. 4 is several frames-several tens of frames, for example.

Referring to FIG. 4, where the elapsed time is the A-th frame-the B-th frame (the A-th frame≦the elapsed time<the B-th frame), a state before the enemy character 72 attacks the player or the player character (before-attack state) is displayed on the game screen 70. At this time, when the player instructs the enemy character 72 with the stick 24, etc. and attacks the enemy character 72, relatively little damage is applied to the enemy character 72, and a relatively small vibration is applied to the game apparatus 10 in response thereto.

It is noted that how to apply the damage to the enemy character 72 and how to apply the vibration to the game apparatus 10 are the same as a case shown in FIG. 3(A), and therefore, a duplicated description will be omitted.

Next, where the elapsed time is the B-th frame-the C-th frame (the B-th frame≦the elapsed time<the C-th frame), a state in which the enemy character 72 attacks the player or the player character (mid-attack state) is displayed on the game screen 70. At this time, when the player instructs the enemy character 72 with the stick 24, etc. and attacks the enemy character 72, medium damage is applied to the enemy character 72, and a middle vibration is applied to the game apparatus 10 in response thereto.

It is noted that how to apply the damage to the enemy character 72 and how to apply the vibration to the game apparatus 10 are the same as a case shown in FIG. 3(B), and therefore, a duplicated description will be omitted.

Then, where the elapsed time is the C-th frame-the D-th frame (the C-th frame≦the elapsed time<the D-th frame), the state after the enemy character 72 attacks the player or the player character (after-attack state) is displayed on the game screen 70. At this time, when the player instructs the enemy character 72 with the stick 24, etc. and attacks the enemy character 72, relatively much damage is applied to the enemy character 72, and a relatively large vibration is applied to the game apparatus 10 in response thereto.

It is noted that how to apply the damage to the enemy character 72 and how to apply the vibration to the game apparatus 10 are the same as a case shown in FIG. 3(C), and therefore, a duplicated description will be omitted.

Thus, in a FIG. 4 example, the action state of the enemy character 72 is changed in the unit of several frames-several tens frames. In a case that the action state of the enemy character 72 is successively changed in short intervals (several frames unit), the player has to make a touch operation in accordance with quick changes of the action state of the enemy character 72, having an advantage of making the game more interesting.

It is noted that in FIG. 4 example, the strength of the vibration is changed in three steps, and but the strength of the vibration may be changed in two steps or four or more steps in the same manner as the above description.

Furthermore, by changing the pulse width of the driving signal, or by changing both the frequency and the pulse width, the vibration pattern may be changed in the same manner as above description.

On the contrary to FIG. 4 example, in a case that the player attacks the enemy character 72 before the enemy character 72 makes an attack, the intensity of the damage to be applied to the enemy character 72 and the strength of the vibration to be applied to the game apparatus 10 may be made large, and in a case that the player attacks the enemy character 72 after the enemy character 72 makes an attack, the intensity of the damage to be applied to the enemy character 72 and the strength of the vibration to be applied to the game apparatus 10 may be made small.

More specifically, the RAM 48 of the game apparatus 10 stores tables as shown in FIG. 5(A) and FIG. 5(B), and the intensity of the damage to be applied to the enemy character 72 and the strength of the vibration to be applied to the game apparatus 10 are changed (determined) according to these tables. Here, a description is made on two tables, and each of the tables stores in association with each of the enemy characters 72. It is noted that in a case that the number of the enemy characters 72 is great, a large amount of capacity of the memory (ROM 28a, RAM 48) is needed. Thus, it may be possible that several kinds of tables are prepared so as to bring each of the enemy characters into association with any one of the tables according to an intention by a developer or a programmer of the game.

FIG. 5(A) is a table for determining the intensity of the damage to be applied to the enemy character 72 and the strength of the vibration to be applied to the game apparatus 10 in correspondence with the arrangement position of the enemy character 72 (Z value) as described with referring to FIG. 3. As understood from FIG. 5(A), where the Z value is Z0-Z1, the damage to be applied to the enemy character 72 is large (HP: 300 P), and the strength of the vibration is strong (the frequency of the driving signal: f3). Where the Z value is Z1-Z2, the damage to be applied to the enemy character 72 is medium (HP: 200 P), and the strength of the vibration is middle (the frequency of the driving signal: f2). In addition, where the Z value is Z2-Z3, the damage to be applied to the enemy character 72 is little (HP: 100 P), and the strength of the vibration is weak (the frequency of the driving signal: f1).

Specifically, when the player performs an operation with the stick 24, etc., the coordinates data input from the touch panel 22 is detected, and it is determined whether or not an attack to the enemy character 72 is made. That is, it is determined whether or not the position coordinates indicated by the coordinates data is included in the display area of the enemy character 72.

Here, as described above, since the resolution of the LCD 14 is the same as the detection accuracy of the touch panel 22, the position coordinates indicated by the coordinates data input from the touch panel 22 is coincident with the position coordinates on the screen of the LCD 14. Accordingly, it is possible to easily determine whether or not the operation by the player is for instructing (attacking) the enemy character 72.

In a case that the position coordinates is not included in the display area of the enemy character 72, it is determined that the attack fails to display a game screen 70 (not illustrated) for representing failure of the attack, for example. On the other hand, in a case that the position coordinates is included in the display area of the enemy character 72, it is determined that the attack succeeds, and the Z value of the enemy character 72 at a time that the player attacks the enemy character 72, that is, the coordinates data is input is obtained.

When the CPU core 42 obtains the Z value of the enemy character 72 at a time that the player or the player character attacks the enemy character 72, the CPU core 42 determines in which range the Z value is included in the table shown in FIG. 5(A), determines the intensity of the damage and the strength of the vibration in correspondence to the determined range, subtracts the HP of the enemy character 72, and drives the eccentric motor 28c to vibrate the game apparatus 10 as described above.

FIG. 5(B) is a table for determining the intensity of the damage to be applied to the enemy character 72 and the strength of the vibration to be applied to the game apparatus 10 in correspondence with the display manner of the enemy character 72 or the state of the enemy character 72 in the game as explained with referring to FIG. 4. As understood from FIG. 5(B), where the elapsed time of the game (or fighting scene) is the A-th frame-the B-th frame (before-attack), the damage to be applied to the enemy character 72 is little (HP: 100 P), and the strength of the vibration is small or weak (the frequency of the driving signal: f1). Then, where the elapsed time of the game (or fighting scene) is the B-th frame-the C-th frame (mid-attack), the damage to be applied to the enemy character 72 is medium (HP: 200 P), and the strength of the vibration is middle (the frequency of the driving signal: f2). In addition, where the elapsed time of the game (or fighting scene) is the C-th frame-the D-th frame, the damage to be applied to the enemy character 72 is much (HP: 300 P), and the strength of the vibration is large or strong (the frequency of the driving signal: f3).

Specifically, when the player performs an operation with the stick 24, etc., the coordinates data input from the touch panel 22 is detected, and it is determined whether or not an attack to the enemy character 72 is made. That is, it is determined whether or not the position coordinates indicated by coordinates data are included in the display area of the enemy character 72. In a case that the position coordinates are not included in the display area of the enemy character 72, it is determined that the attack fails to display a game screen 70 (not illustrated) for representing failure of the attack, for example. On the other hand, in a case that the position coordinates are included in the display area of the enemy character 72, it is determined that the attack succeeds, and the elapsed time (frame) of the game (or fighting scene) at a time that the player attacks the enemy character 72, that is, the coordinates data is input is obtained.

It is noted that although omitted in FIG. 2, if a frame counter is provided so as to be connected to the bus 44, it becomes possible to obtain the count value (the number of frames) of the frame counter when the coordinates data is input. It is noted that the frame counter needs to be reset and started at a start of the game or the fighting scene.

When the CPU core 42 obtains the elapsed time (frame) at a time that the player or the player character attacks the enemy character 72, the CPU core 42 determines in which range the elapsed time is included from the table shown in FIG. 5(B), and determines the intensity of the damage and the strength of the vibration in correspondence to the range of the determined elapsed time, subtracts the HP of the enemy character 72, and drives the eccentric motor 28c to vibrate the game apparatus 10 as described above.

As described above, when the animation of the enemy character 72 is changed in the order of the before-attack, the mid-attack, and the after-attack, it is determined which state the current animation is according to the elapsed time in this embodiment. By storing flags each indicating the before-attack, the mid-attack, and the after-attack, and referring with these flags, it may be possible to determine which state the current animation is. For example, a before-attack flag, a mid-attack flag, an after-attack flag are provided in the RAM 48, and where the animation illustrates the mid-attack, the before-attack flag and the after-attack flag are turned off, and the mid-attack flag is turned on. Accordingly, it is possible to easily determine which state the current animation is depending on the on/off of these flags.

It is noted that although the table is brought into association with each enemy character 72 in this embodiment, the table to be used may be selected as necessary according to the proceeding of the game (event, etc.).

In addition, the table needs not to be brought into association with all the enemy characters 72. That is, by associating the table with only a part of the enemy characters 72, a presentation for vibrating the game apparatus 10 can be performed in only the fighting scene with a part of the enemy characters 72.

Figure 6:
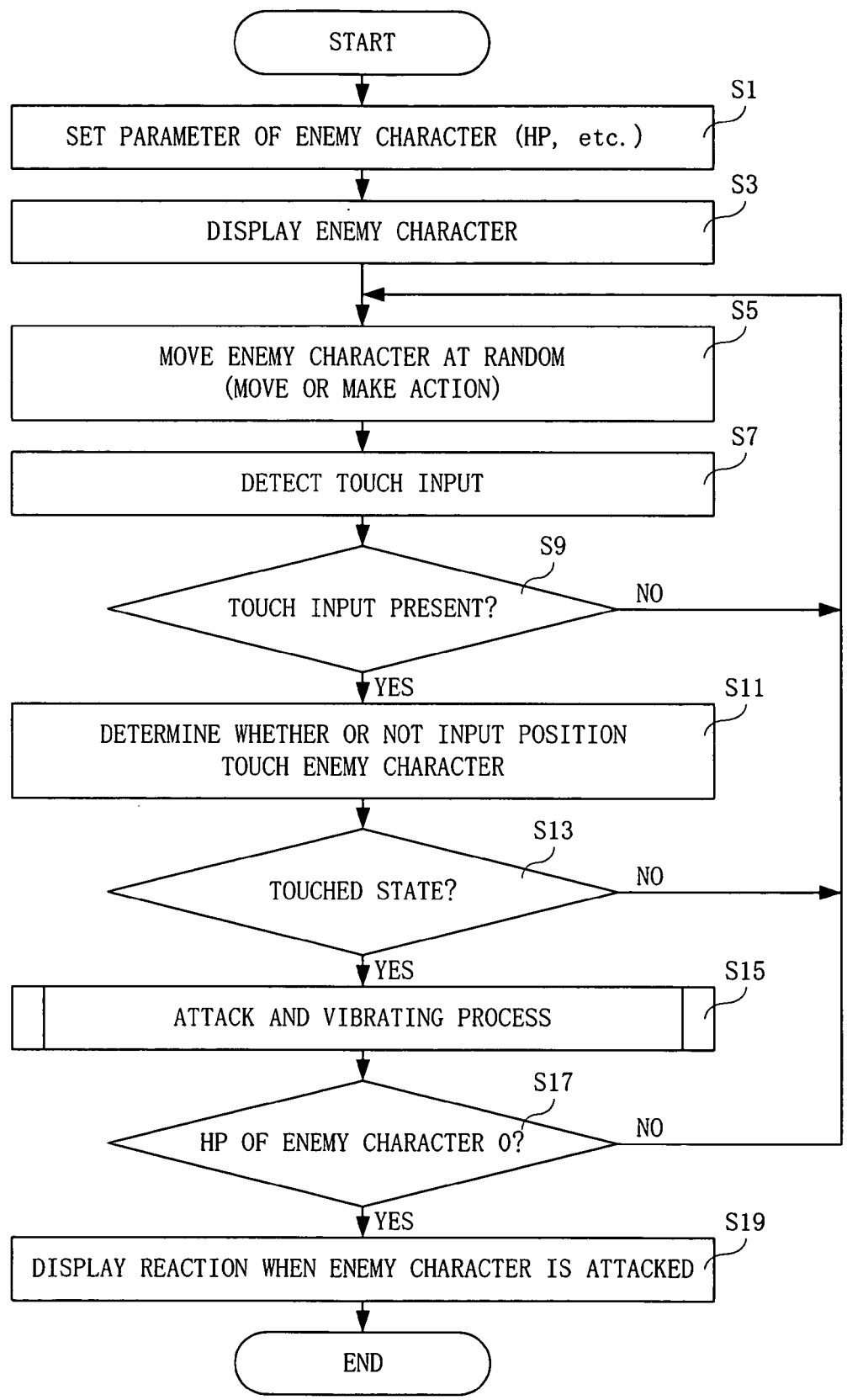
FIG. 6 is a flowchart showing a process in a fighting scene of the CPU core shown in FIG. 2.

Specifically, the CPU core 42 shown in FIG. 2 performs a flowchart shown in FIG. 6. The flowchart shown in FIG. 6 is a game process of a scene (fighting scene, for example) in which the enemy character 72 appears. Referring to FIG. 6, the CPU core 42, when the game process of the scene in which the enemy character 72 appears starts, sets parameters (HP, offensive power (MP)) of the enemy character 72 in a step S1. That is, although omitted in the drawing, the RAM 48 stores character image data for generating an image for each enemy character 72, and also stores its parameters (HP, MP). The HP and MP are values determined by a developer, a programmer, or the like of the game in advance, and different values are set thereto depending on the strength (level) of the enemy character 72, for example. The HP and the MP are read from the working area of the RAM 48.

In a succeeding step S3, the enemy character 72 is displayed on the game screen 70. That is, the CPU core 42 applies a graphics command and an image generation program to the GPU 52. In response thereto, the GPU 52 creates the game screen 70 including the enemy character 72 on the VRAM 58. Then, the CPU core 42 controls the LCD controller 60 to display a game screen 70 on the LCD 14.

In a next step S5, the enemy character 72 is moved at random. Examples are to move the enemy character 72 from the depth of the screen to the front of the screen, to cause the enemy character 72 to perform an action such as an attack movement, and so forth. Then, in a step S7, a touch input (input operation with the touch panel 22) is detected. That is, although illustration is omitted, a reading process of the buffer (buffer for temporarily storing the coordinates data from the touch panel 22) corresponding to the touch panel 22 provided in the I/F circuit 54 is executed.

Then, it is determined whether or not a touch input is present in a step S9. That is, it is determined whether or not the coordinates data is stored in the buffer corresponding to the touch panel 22. If "NO" in the step S9, that is, if the coordinates data is not input, it is determined that there is no touch input, and then, the process directly returns to the step S5. On the other hand, if "YES" in the step S9, that is, if the coordinates data is input, it is determined that there is the touch input, and then, it is determined the input position touches the enemy character 72 in a step S11. That is, it is determined whether or not the position coordinates of the coordinates data input from the touch panel 22 is included in the display area of the enemy character 72.

In a next step S13, it is determined whether or not the input position touches the enemy character 72. That is, it is determined whether or not the determination result in the step S11 shows a touched state. If "NO" in the step S13, that is, if the input position does not touch the enemy character 72, it is determined the attack fails, and the process proceeds to the step S5. It is noted that it is appropriate that the game screen 70 for representing failure of the attack is displayed on the LCD 14 as described above, and then, the process directly returns to the step S5.

On the other hand, if "YES" in the step S13, that is, if the input position touches the enemy character 72, it is determined that the attack succeeds to execute an attack and vibrating process (see FIG. 7-FIG. 8, FIG. 9-FIG. 10) described later in a step S15, and then, it is determined whether or not the HP of the enemy character 72 is 0 in a step S17. That is, it is determined whether or not the player or the player character defeats the enemy character 72.

If "NO" in the step S17, that is, if the HP of the enemy character is not 0, it is determined the player or the player character does not defeat the enemy character 72, and then, the process returns to the step S5. On the other hand, if "YES" in the step S17, that is, if the HP of the enemy character 72 is 0, it is determined that the player or the player character defeats the enemy character 72, and a game screen 70 (not illustrated) in which a reaction of the enemy character 72 when being defeated is represented is displayed in a step S19, and then, a game process in the scene where the enemy character 72 appears is ended.

It is noted, although illustration is omitted, in a case that the HP of the player or the player character becomes 0 due to the attack by the enemy character 72, the game is over.

Figure 7:
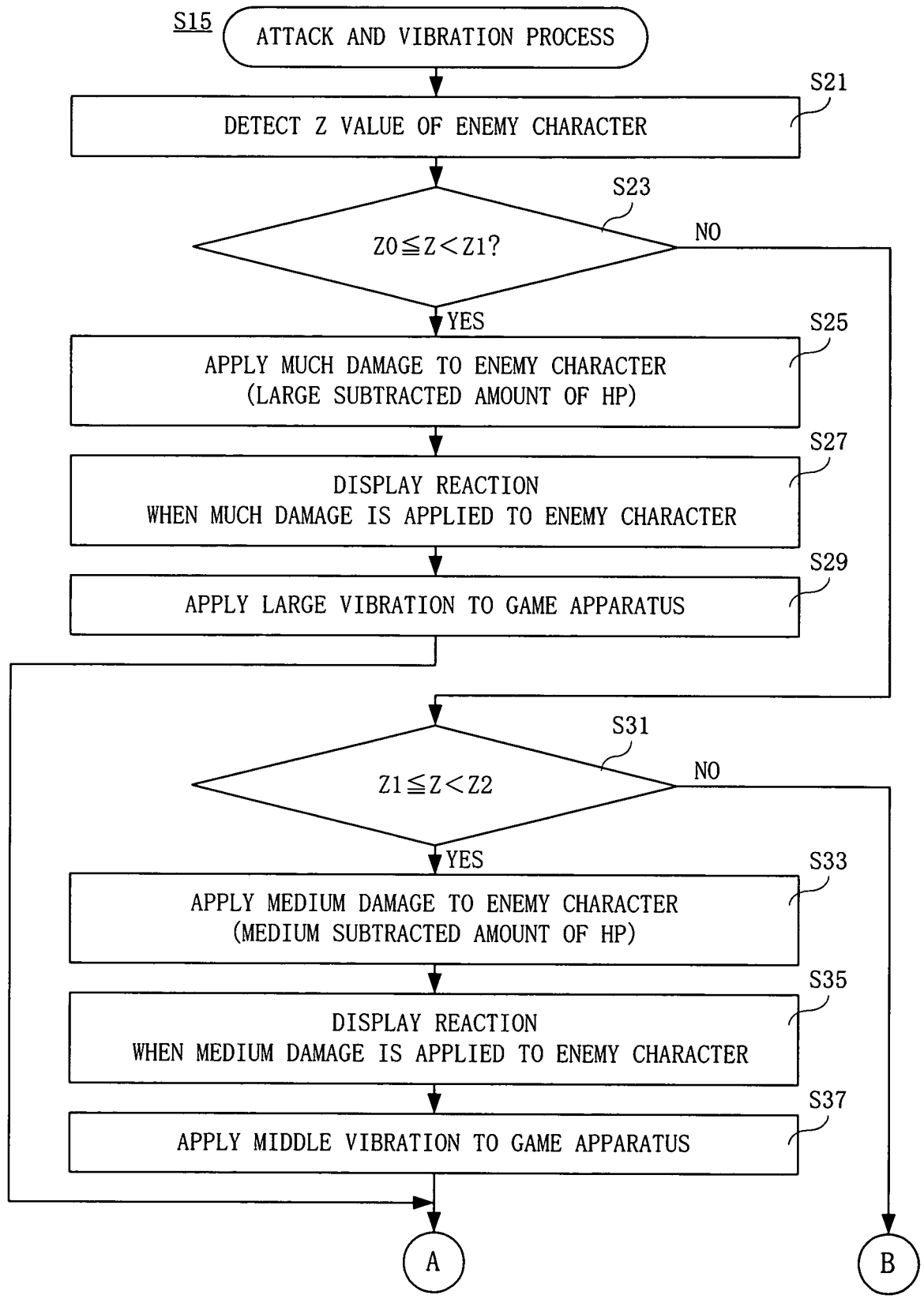
FIG. 7 is a flowchart showing a part of an attack and vibration process (1) of the CPU core shown in FIG. 2.
Figure 8:
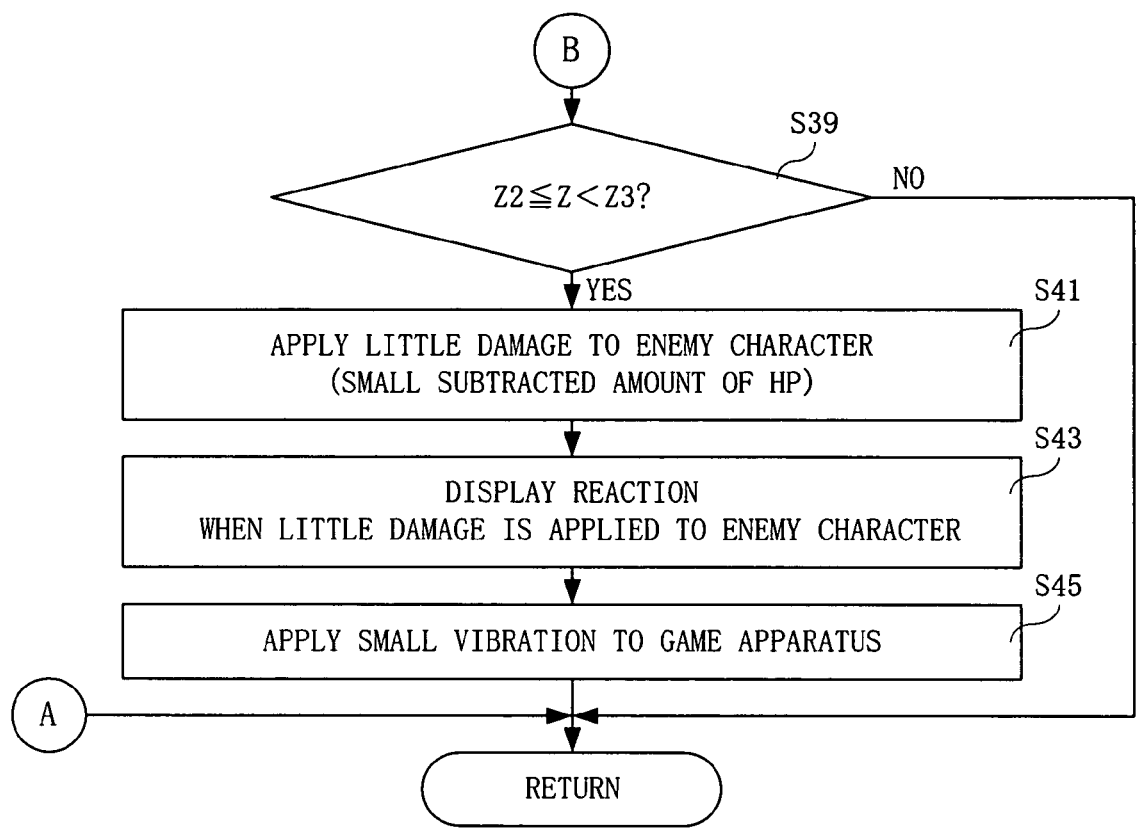
FIG. 8 is a flowchart continued from the attack and vibration process (1) shown in FIG. 7.
Figure 9:
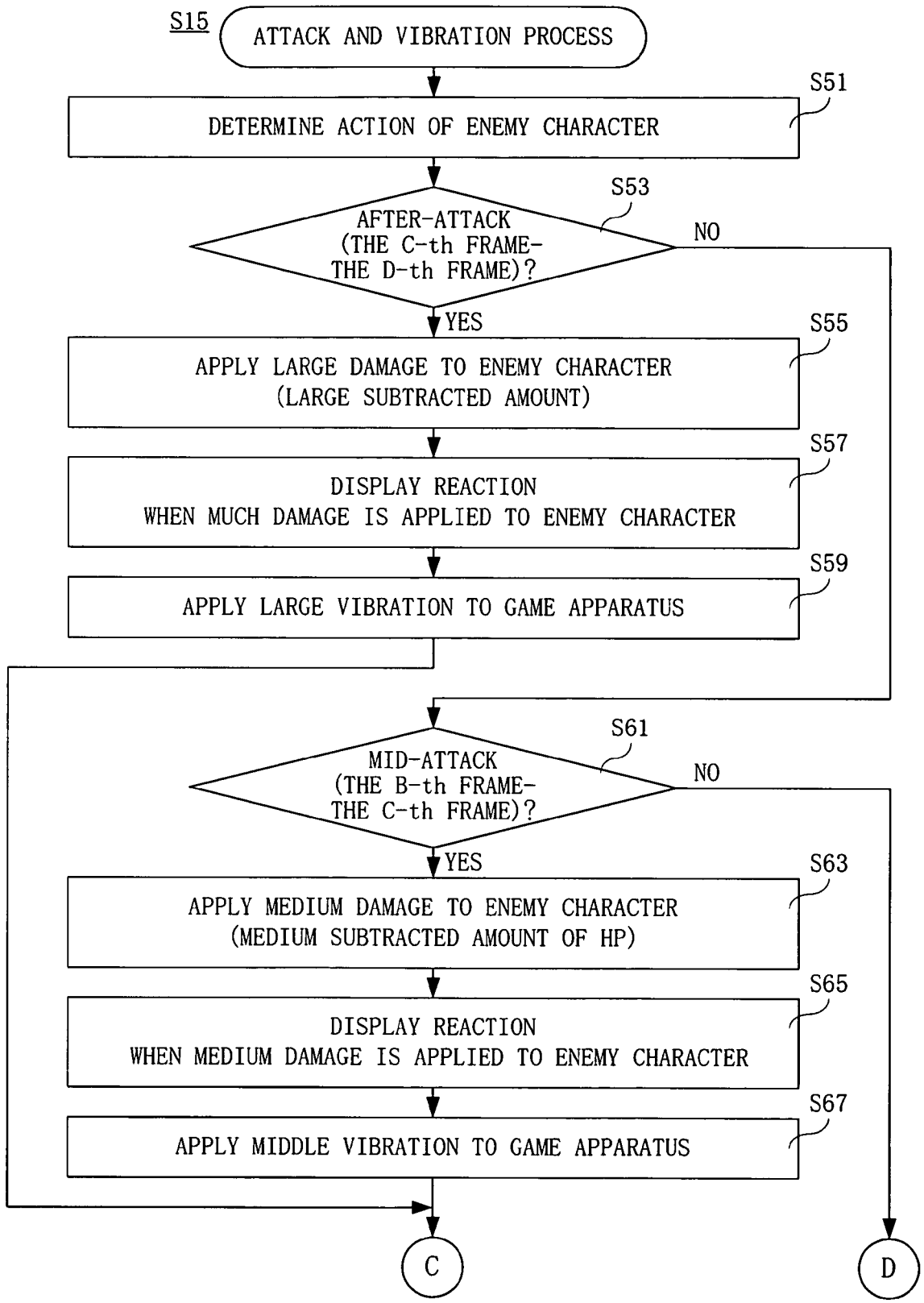
FIG. 9 is a flowchart showing a part of an attack and vibration process (2) of the CPU core shown in FIG. 2.
Figure 10:
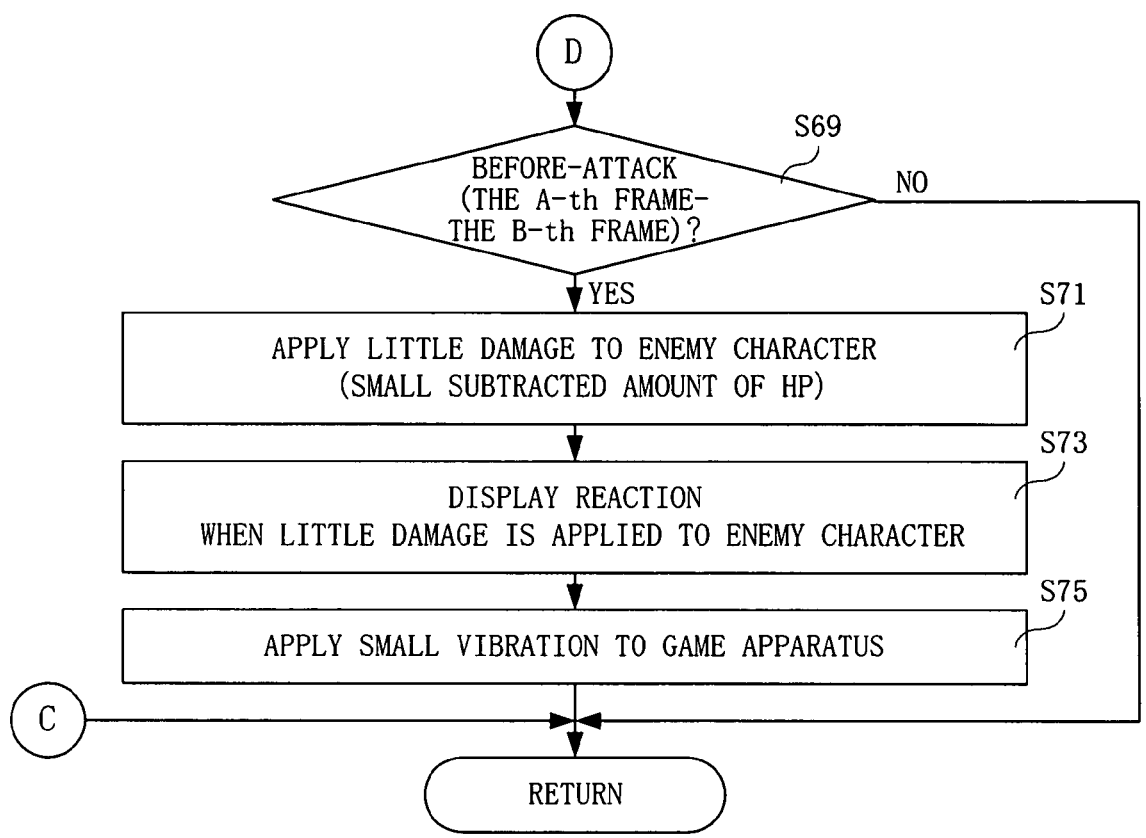
FIG. 10 is a flowchart continued from the attack and vibration process (2) shown in FIG. 9.

Each of the flowchart of FIG. 7 and FIG. 8 and the flowchart of FIG. 9 and FIG. 10 is a flowchart showing the attack and vibration process in the step S15 shown in FIG. 6. FIG. 7 and FIG. 8 are the flowchart showing an attack and vibration process in a case where the intensity of the damage to be applied to the enemy character 72 and the strength of the vibration to be applied to the game apparatus 10 are changed depending on the arrangement position (Z value) of the enemy character 72 when the player or the player character attacks the enemy character 72. FIG. 9 and FIG. 10 are the flowchart showing an attack and vibration process in a case where the intensity of the damage to be applied to the enemy character 72 and the strength of the vibration to be applied to the game apparatus 10 are changed depending on the elapsed time (frame) when the player or the player character attacks the enemy character 72. For the sake of explanation, the process of the flowchart shown in FIG. 7 and FIG. 8 is referred to as an attack and vibration process (1), and the process of flowchart shown in FIG. 9 and FIG. 10 is referred to as an attack and vibration process (2).

It is noted that as described above, since the table is associated for each enemy character 72 in this embodiment, in the flowchart shown in FIG. 6, the table corresponding to the enemy character 72 displayed in the step S3 is determined before the process in the step S15, or specifically, at any point from the step S3 to the step S15 in order to select which process is to be executed, the attack and vibration processes (1) or (2).

Referring to FIG. 7, when the CPU core 42 starts the attack and vibration process (1), the Z value of the enemy character 72 is detected in a step S21. In a succeeding step S23, it is determined whether or not the Z value is within the Z0-Z1 range (Z0≦Z<Z1). If "NO" in the step S23, that is, if the Z value of the enemy character 72 is not within the Z0-Z1 range, the process directly proceeds to a step S31. On the other hand, if "YES" in the step S23, that is, if the Z value of the enemy character 72 is within the Z0-Z1 range, the much damage is applied to the enemy character 72 in a step S25. That is, the CPU core 42 subtracts 300 P from the HP of the enemy character 72 according to the table shown in FIG. 5(A). Next, in a step S27, a reaction of the enemy character 72 when being subjected to the much damage is represented. That is, the game screen 70 in which a damaged state of the enemy character 72 is represented with an extravagant presentation is displayed. At this time, a presentation by the sound (music) representing the much damage may be added. Then, in a step S29, a large vibration is applied to the game apparatus 10 according to the table shown in FIG. 5(A), and then, the attack and vibration process (1) is returned as shown in FIG. 8. That is, in the step S29, the CPU core 42 applies a driving signal of frequency f3 (400 Hz) with a constant pulse width W1 to the eccentric motor 28c.

In the step S31, it is determined whether or not the Z value is within the Z1-Z2 range (Z1≦Z<Z2). If "NO" in the step S31, that is, if the Z value is not within the Z1-Z2 range, the process proceeds to a step S39 shown in FIG. 8. On the other hand, if "YES" in the step S31, that is, if the Z value is within the Z1-Z2 range, the medium damage is applied to the enemy character 72 in a step S33. That is, the CPU core 42 subtracts 200 P from the HP of the enemy character 72 according to the table shown in FIG. 5 (A). Next in a step S35, a reaction of the enemy character 72 when the medium damage is applied is displayed. That is, a game screen 70 in which the damaged state of the enemy character 72 is represented so as to be directed to be simpler than in the large damaged case. At this time, a presentation by the sound (music) representing the medium damage may be added. Then, in a step S37, the medium vibration is applied to the game apparatus 10 according to the table shown in FIG. 5(A), and then, the attack and vibration process (1) is returned. That is, in the step S37, the CPU core 42 applies a driving signal of frequency f2 (300 Hz) with a constant pulse width W1 to the eccentric motor 28c.

As shown in FIG. 8, it is determined whether or not the Z value is within the Z2-Z3 range (Z2≦Z<Z3) in the step S39. If "NO" in the step S39, that is, if the Z value is not within the Z2-Z3 range, the attack and vibration process (1) is directly returned. That is, when attacking the enemy character 72, in a case that the Z value of the enemy character 72 when being attacked does not fall in any range of the table shown in FIG. 5(A), it is determined that the attack fails due to the defense by the enemy character 72, for example, and then, the attack and vibration process (1) is directly returned. It is noted that in such a case, a game screen 70 in which the enemy character 72 defends from the attack of the player or the player character may be displayed.

On the other hand, if "YES" in the step S39, that is, if the Z value is within the Z2-Z3 range, the little damage is applied to the enemy character 72 in a step S41. That is, the CPU core 42 subtracts 100 P from the HP of the enemy character 72 according to the table shown in FIG. 5(A). Next, in a step S43, a reaction of the enemy character 72 when the little damage is applied is displayed. That is, the damaged state of the enemy character 72 is represented so as to be directed to be simpler than that in the middle damaged state. At this time, a presentation by the sound (music) representing the little damage may be added. Then, in a step S45, a small vibration is applied to the game apparatus 10 according to the table shown in FIG. 5(A), and then, the attack and vibration process (1) is returned. That is, in the step S45, the CPU core 42 applies a driving signal of frequency f1 (200 Hz) with a constant pulse width W1 to the eccentric motor 28c.

FIG. 9 and FIG. 10 are a flowchart showing the attack and vibration process (2). The attack and vibration process (2) is approximately the same as the attack and vibration process (1), and therefore, a description on the duplicated process is simply made. Referring to FIG. 9, the CPU core 42 determines an action of the enemy character 72 at a start of the attack and vibration process (2) in a step S51. Here, the elapsed time (frame) is detected from the frame counter to determine whether or not the action of the enemy character 72 is the before-attack, the mid-attack, and the after-attack according to the table shown in FIG. 5(B).

In a succeeding step S53, it is determined whether or not the action of the enemy character 72 is the after-attack. That is, it is determined whether or not the elapsed time is within the C-th frame-the D-th frame range (the C-th frame≦the elapsed time<the D-th frame). Here, if the elapsed time is not within the C-th frame-the D-th frame range, it is determined that the action of the enemy character 72 is not after-attack, "NO" is determined in the step S53, and then, the process proceeds to a step S61. However, if the elapsed time is within the C-th frame-the D-th frame range, it is determined that the action of the enemy character 72 is the after-attack, that is, "YES" is determined in the step S53. Then, in a step S55, the much damage is applied to the enemy character 72 according to the table shown in FIG. 5(B). Next, in a step S57, a reaction of the enemy character 72 when the much damage is applied is represented. In a step S59, according to the table shown in FIG. 5(B), the large vibration is applied to the game apparatus 10, and then, the attack and vibration process (2) is returned as shown in FIG. 10.

In the step S61, it is determined whether or not the action of the enemy character 72 is the mid-attack. That is, it is determined whether or not the elapsed time is within the B-th frame-the C-th frame range (the B-th frame≦the elapsed time<the C-th frame). Here, if the elapsed time is not within the B-th frame-the C-th frame range, it is determined that the action of the enemy character 72 is not the mid-attack, and then, the process proceeds to a step S69 shown in FIG. 10. However, if the elapsed time is-within the B-th frame-the C-th frame range, it is determined the action of the enemy character 72 is the mid-attack, and the medium damage is applied to the enemy character 72 according to the table shown in FIG. 5(B) in a step S63. Then, a reaction of the enemy character 72 when the medium damage is applied is displayed in a step S65, and the middle vibration is applied to the game apparatus 10 according to the table shown in FIG. 5(B) in a step S67, and then, the attack and vibration process (2) is returned as shown in FIG. 10.

In the step S69 shown in FIG. 10, it is determined whether or not the action of the enemy character 72 is the before-attack. That is, it is determined whether or not the elapsed time is within the A-th frame-the B-th frame range (the A-th frame≦the elapsed time<the B-th frame). Here, if the elapsed time is not within the A-th frame-the B-th frame range, it is determined that the action of the enemy character 72 is not the before-attack, and the attack and vibration process (2) is returned. However, if the elapsed time is within the A-th frame-the B-th frame range, it is determined that the action of the enemy character 72 is the before-attack state, and the little damage is applied to the enemy character 72 according to the table shown in FIG. 5(B) in a step S71. In a following step S73, a reaction of the enemy character 72 when the little damage is applied is displayed, and the small vibration is applied to the game apparatus 10 according to the table shown in FIG. 5(B) in a step S75, and then, the attack and vibration process (2) is returned as shown in FIG. 10.

According to this embodiment, since the kind of the vibration is changed according to the display manner of the character or the state of the character in the game, it is possible to inform the player of the display manner of the character or the state of the character in the game by the vibration in addition to the display on the game screen and the output of the game sound (music). Thus, the player can obtain a new sense of operation with reality.

It is noted that the intensity of the damage and the strength of the vibration (kind) are changed according to the arrangement position (Z value) of the character and the action state of the character in the above-described embodiment. However, the intensity of the damage and the kind of the vibration can also be changed according to the HP of the enemy character. Also, the intensity of the damage and the kind of the vibration can be changed depending on whether the enemy character is the attack state.

In the former, for example, according to the table shown in FIG. 11(A), the intensity of the damage to be applied to the enemy character 72 and the strength of the vibration to be applied to the game apparatus 10 are determined. According to this table, the CPU core 42, when the player or the player character attacks the enemy character 72, obtains (detects) the HP of the enemy character, and determines the intensity of the damage and the strength of the vibration in correspondence to a numerical value of the obtained HP. It may be possible to utilize a table for determining the intensity of the damage and the strength of the vibration according to the MP and the LV of the enemy character in place of the HP. Or, it may be possible to utilize a table for determining the intensity of the damage and the strength of the vibration according to a combination of two or more of the HP, MP and LV as to the enemy character. Thus, it is possible to determine the intensity of the damage and the strength of the vibration according to the attribution of the character such as the HP, the MP, and the LV.

In addition, although detailed description is omitted, by storing the mentality as the attribute of the enemy character 72 and updating it in correspondence to the proceeding of the game, the intensity of the damage to be applied to the enemy character 72 and the strength of the vibration to be applied to the game apparatus 10 can be changed depending on the mentality. For example, in a case that the mentality of the enemy character 72 is changed between the normal state and the excited state, when the mentality of the enemy character 72 at a time that the player or the player character attacks the enemy character 72 is the normal state, the damage to be applied to the enemy character 72 and the strength of the vibration to be applied to the game apparatus 10 are made small. On the contrary, when the mentality of the enemy character 72 is the excited state, the damage to be applied to the enemy character 72 and the strength of the vibration to be applied to the game apparatus 10 are made large.

In the latter, the damage to be applied to the enemy character 72 and the strength of the vibration to be applied to the game apparatus 10 are determined according to the table shown in FIG. 11(B), for example. According to the table, the CPU core 42, when the player or the player character attacks the enemy character 72, determines whether or not the enemy character 72 is in the attack state, and determines whether the normal state or the defensive state if not the attack state, and the intensity of the damage and the strength of the vibration according to any state determined by the elapsed time (frame).

It is noted that when the animation of the enemy character 72 is changed between the attack state, the normal state, and the defensive state as described above, flags respectively corresponding to the states are stored, and by referring these flags, it is determined which is the current state.

In addition, although a description is made on the game apparatus with two screens (LCD 12 and 14) in the above-described embodiment, it is needless to say that the game apparatus with one screen, if only the touch panel is provided, can be applied.

Furthermore, although the eccentric motor (vibrator) is integrated in the game cartridge in the above-described embodiment, it may be integrated at any position within the housing 16. It is noted that the vibration is directly or indirectly transmitted to the fingers (hands) of the player via the stick, and therefore, it is appropriate that at least the screen (at least one of the LCD 14 and the touch panel 22) on which a touch input is performed is vibrated. In such a case, the features disclosed in Japanese Patent Laying-open No. 11-85400 shown in the prior art can be adopted. Specifically, the LCD 14 is set (supported) on the housing 16b in a state it can be vibrated by a vibration element. Thus, it is possible to provide the vibrator inside the game apparatus 10.

In addition, although a description is made on the fighting game with the enemy character in the above-described embodiment, it is not limited thereto. For example, the exemplary embodiment presented herein is applied to such a game where in a case that the character image changes its arrangement position in time sequence, when the player points the character image in a predetermined arrangement position, he or she can get a high score, and when the player points the character image located away from the predetermined arrangement position, he or she gets a low score. In this case, the closer the character image is arranged to the predetermined arrangement position, the higher score the player obtains, and the stronger the strength of the vibration is made. On the other hand, the farther the character image is arranged from the predetermined arrangement position, the lower score the player can obtain, and the weaker the strength of the vibration is made.

In the above-described embodiment, the eccentric motor is provided as the vibrator, and by at least one of the frequency and the pulse width of the driving signal (PWM signal), the strength of the vibration is changed. However, in a case that the voice coil is utilized as the vibrator, by changing a crest value (vibration amplitude) as well as the frequency and the pulse width, the strength of the vibration can be changed.

In addition, in the above-described embodiment, depending on the display manner of the enemy character or the state of the enemy character in the game the intensity of the damage and the strength of the vibration are changed. However, depending on the display manner of the player character or the state of the player character in the game, the intensity of the damage and the strength of the vibration may be changed.

Although the exemplary embodiment has been described and illustrated in detail, it is clearly understood that the same is by way of illustration and example only and is not to be taken by way of limitation, the spirit and scope being limited only by the terms of the appended claims.

What is claimed is:

1. A method of controlling a game apparatus provided with a touch panel having an associated display, and a vibrator for vibrating at least a screen of said display, including:

displaying a game character on said screen, said character having at least one associated game related parameter;

selecting said character by using a pointing device on said touch panel;

detecting the state of a parameter associated with said character in response to said selection of said character by a player; and vibrating said vibrator in a vibration pattern according to the state of the detected parameter when the player directly touches said character, wherein said game related parameter comprises a position of the game character in a game space.

2. A game apparatus provided with a display for displaying a game screen, a touch panel provided in association with the display, and a vibrator for vibrating at least a screen of said display, comprising:
- a game screen for displaying the game including an image of a character appearing in a game on the screen of said display;
- updating programmed logic circuitry for updating a parameter for changing a display manner of said character or a state of said character in the game in correspondence to the proceeding of the game;
- detecting programmed logic circuitry for detecting position coordinates in response to an operation input to said touch panel by a player;
- obtaining programmed logic circuitry for obtaining the parameter of said character at a time of the operation input to said touch panel when the player directly touches the display area of said character; and
- vibration controlling programmed logic circuitry for vibrating said vibrator in a vibration pattern according to the parameter obtained by said obtaining programmed logic circuitry, wherein
- said updating programmed logic circuitry updates arrangement coordinates of said character in a game space, and
- said vibration controlling programmed logic circuitry vibrates said vibrator in a vibration pattern according to said arrangement coordinates.

3. The game apparatus according to claim 2, wherein
- said updating programmed logic circuitry updates a flag for determining whether at least said character is in an attack state or a non-attack state, and
- said vibration controlling programmed logic circuitry vibrates said vibrator in a vibration pattern according to turn-on/off of said flag.

4. The game apparatus according to claim 2, wherein
- said updating programmed logic circuitry updates life, offensive power and mentality of said character, and
- said vibration controlling programmed logic circuitry vibrates said vibrator in a vibration pattern according to at least one of the life, offensive power and mentality of said character.

5. The game apparatus according to claim 2, wherein
- said vibration controlling programmed logic circuitry includes selecting one vibration pattern corresponding to said parameter out of a plurality of vibration patterns.

6. A storage medium storing a game program of a game apparatus provided with a display for displaying a game screen, a touch panel provided in association with the display, and a vibrator for vibrating at least a screen of said display, said game program causes a processor of said game apparatus to execute:
- displaying the game screen including an image of a character appearing in a game on the screen of said display;
- updating a parameter for changing a display manner of said character or a state of said character in the game in correspondence to the proceeding of the game;
- detecting position coordinates in response to an operation input to said touch panel by a player;
- obtaining the parameter of said character at a time of the operation input to said touch panel when the player directly touches the display area of said character; and
- vibration controlling for vibrating said vibrator in a vibration pattern according to the parameter obtained by said obtaining, wherein
- said updating updates arrangement coordinates of said character in a game space, and
- said vibration controlling vibrates said vibrator in a vibration pattern according to said arrangement coordinates.

7. The storage medium storing a game program according to claim 6, wherein
- said updating updates a flag for determining whether at least said character is in an attack state or a non-attack state, and
- said vibration controlling vibrates said vibrator in a vibration pattern according to turn-on/off of said flag.

8. The storage medium storing a game program according to claim 6, wherein
- said updating updates life, offensive power and mentality of said character, and
- said vibration controlling vibrates said vibrator in a vibration pattern according to at least one of the life, offensive power and mentality of said character.

9. The storage medium storing a game program according to claim 6, wherein
- said vibration controlling includes selecting one vibration pattern corresponding to said parameter out of said plurality of vibration patterns.

10. A game controlling method of a game apparatus provided with a display for displaying a game screen, a touch panel provided in association with the display, and a vibrator for vibrating at least a screen of said display, includes:
- displaying the game screen including an image of a character appearing in a game on the screen of said display;
- updating a parameter for changing a display manner of said character or a state of said character in the game in correspondence to the proceeding of the game;
- detecting position coordinates in response to an operation input to said touch panel by a player;
- obtaining the parameter of said character at a time of the operation input to said touch panel when the player directly touches the display area of said character; and
- vibrating said vibrator in a vibration pattern according to the parameter obtained by said obtaining the parameter, wherein
- said updating a parameter updates arrangement coordinates of said character in a game space, and
- said vibrating vibrates said vibrator in a vibration pattern according to said arrangement coordinates.

11. The game controlling method according to claim 10, wherein
- said updating a parameter updates a flag for determining whether at least said character is in an attack state or a non-attack state, and
- said vibrating vibrates said vibrator in a vibration pattern according to turn-on/off of said flag.

12. The game controlling method according to claim 10, wherein
- said updating a parameter updates life, offensive power and mentality of said character, and
- said vibrating vibrates said vibrator in a vibration pattern according to at least one of the life, offensive power and mentality of said character.

13. The game controlling method according to claim 10, wherein
- said vibrating includes selecting one vibration pattern corresponding to said parameter out of said plurality of vibration patterns.

* * * * *